United States Patent
Nagamine et al.

(10) Patent No.: US 8,893,115 B2
(45) Date of Patent: Nov. 18, 2014

(54) APPARATUS HAVING DATA INSTALLED AND METHOD OF UPGRADING DATA

(75) Inventors: Kazuaki Nagamine, Kawasaki (JP); Eiji Iida, Kawasaki (JP); Miwa Taniguchi, Kawasaki (JP); Tomoyuki Kanzaki, Kawasaki (JP); Toshihiro Suzuki, Kawasaki (JP); Shingo Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1432 days.

(21) Appl. No.: 12/361,958

(22) Filed: Jan. 29, 2009

(65) Prior Publication Data

US 2009/0204653 A1   Aug. 13, 2009

(30) Foreign Application Priority Data

Feb. 13, 2008   (JP) ................. 2008-032365

(51) Int. Cl.
*G06F 9/45* (2006.01)
*G06F 3/00* (2006.01)
*G06F 9/445* (2006.01)

(52) U.S. Cl.
CPC .................... *G06F 8/65* (2013.01)
USPC ........... 717/174; 717/168; 717/169; 717/170; 717/173; 719/313; 719/319

(58) Field of Classification Search
CPC ........................................ G06F 8/71
See application file for complete search history.

(56) References Cited

U.S. PATENT DOCUMENTS

| | | | | |
|---|---|---|---|---|
| 5,594,639 A * | 1/1997 | Atsumi | .......................... | 700/107 |
| 5,799,189 A * | 8/1998 | Koser et al. | ................... | 719/319 |
| 6,006,034 A * | 12/1999 | Heath et al. | ................... | 717/170 |
| 6,675,382 B1 | 1/2004 | Foster | | |
| 7,047,527 B1 * | 5/2006 | Lin et al. | ........................ | 717/170 |
| 7,080,372 B1 * | 7/2006 | Cole | ............................. | 717/173 |
| 7,467,386 B2 * | 12/2008 | Gallagher et al. | ............ | 719/313 |

(Continued)

FOREIGN PATENT DOCUMENTS

| | | |
|---|---|---|
| JP | 2003-202931 | 7/2003 |
| JP | 2007-334636 | 12/2007 |

OTHER PUBLICATIONS

Olivier Crameri et al., "Staged Deployment in Mirage, an Integrated Software Upgrade Testing and Distribution System", [Online], ACM 2007, pp. 221-236, [Retrieved from Internet on Aug. 21, 2014], <http://delivery.acm.org/10.1145/1300000/1294283/p221-crameri.pdf>.*

Petr Hosek et al., "Safe Software Updates via Multi-version Execution", [Online], ACM 2013, pp. 612-621, [Retrieved from Internet on Aug. 21, 2014], <http://delivery.acm.org/10.1145/2490000/2486869/p612-hosek.pdf>.*

(Continued)

*Primary Examiner* — Thuy Dao
*Assistant Examiner* — Ziaul A Chowdhury
(74) *Attorney, Agent, or Firm* — Staas & Halsey LLP

(57) ABSTRACT

In an apparatus having data installed therein, the apparatus includes a data storage part for storing a (n+1)th-order file obtained by bundling an nth-order file and (n+1)th data corresponding to an (n+1)th function level into one file, wherein n is an integer, an identifier storage part for storing an identifier indicating a function level of data to be installed in the apparatus, and a controller for detecting the function level based on the identifier stored in the identifier storage part, de-bundling the (n+1)th-order file stored in the data storage unit as many as times corresponding to the function level, and applying the de-bundled data to the apparatus.

9 Claims, 12 Drawing Sheets

(56) References Cited

U.S. PATENT DOCUMENTS

| | | | |
|---|---|---|---|
| 7,921,421 B2* | 4/2011 | Kawaguchi | 717/170 |
| 7,971,200 B2* | 6/2011 | Gayda et al. | 717/168 |
| 8,291,403 B2* | 10/2012 | Li et al. | 717/168 |
| 8,533,704 B2* | 9/2013 | Wookey | 717/174 |
| 2002/0087876 A1 | 7/2002 | Larose | |
| 2003/0005427 A1* | 1/2003 | Herrero | 717/178 |
| 2005/0132350 A1* | 6/2005 | Markley et al. | 717/168 |
| 2006/0112387 A1* | 5/2006 | Butt et al. | 717/177 |
| 2007/0106980 A1 | 5/2007 | Felts | |
| 2007/0174832 A1* | 7/2007 | Brehm et al. | 717/174 |
| 2007/0226273 A1* | 9/2007 | Rath et al. | 707/203 |
| 2007/0294684 A1 | 12/2007 | Kumashiro et al. | |
| 2008/0244555 A1* | 10/2008 | Welvaert et al. | 717/169 |

OTHER PUBLICATIONS

Manolis I. A. Lourakis et al., "SBA: A Software Package for Generic Sparse Bundle Adjustment", [Online], ACM 2009, pp. 1-30, [Retrieved from Internet on Aug. 21, 2014], <http://delivery.acm.org/10.1145/1490000/1486527/a2-lourakis.pdf>.*

Robert Filepp et al., "Image Selection as a Service for Cloud Computing Environments", [On line], IEEE-2010, pp. 1-8, [Retrieved from Internet on Aug. 21, 2014], <http://ieeexplore.ieee.org/stamp/stamp.jsp?tp=&arnumber=5707149>.*

United Kingdom Search Report dated May 8, 2009 for corresponding United Kingdom Application No. GB0901570.2.

UK Office Action dated Oct. 24, 2011 issued in corresponding UK Patent Application No. GB0901570.2.

* cited by examiner

FIG. 8

| | RELEASE-1 | RELEASE-2 | RELEASE-3 | RELEASE-4 |
|---|---|---|---|---|
| UNIT-1 | | ISSUE-1 | | |
| UNIT-2 | ISSUE-1 | ISSUE-2 | ISSUE-3 | ISSUE-4 |
| UNIT-3 | | ISSUE-1 | | |
| UNIT-4 | NON-ISSUE | | ISSUE-1 | |
| UNIT-5 | NON-ISSUE | | ISSUE-1 | |
| UNIT-6 | NON-ISSUE | | ISSUE-1 | ISSUE-2 |
| UNIT-7 | NON-ISSUE | | ISSUE-1 | ISSUE-2 |

APPARATUS HAVING DATA INSTALLED AND METHOD OF UPGRADING DATA

CROSS-REFERENCE TO RELATED APPLICATIONS

This application is based upon and claims the benefit of priority of the prior Japanese Patent Application No. 2008-032365, filed on Feb. 13, 2008, the entire contents of which are incorporated herein by reference.

FIELD

The embodiments discussed herein are related to an apparatus having a plurality of pieces of data such as program data installed therein in a bundled form (a data pack) and having a capability of upgrading the data, and a method of upgrading data such as program data installed in the apparatus by using the data pack.

BACKGROUND

In many cases of developing a transmission apparatus having a plurality of transmission line interfaces, the development is performed via a plurality of cycles to achieve functions required by a user, within a period that meets a delivery requested by the user. In the development, functions of the transmission line interface supported by the transmission apparatus are added in each development cycle, and the resultant transmission apparatus is released. For this purpose, units having transmission line interface functions are configured so as to be compatible when they are installed in transmission apparatuses. Furthermore, to achieve high flexibility in design, functions are expanded by changing program data in each unit without changing hardware. More specifically, for the above purpose, an FPGA (Field Programmable Gate Array), a DSP (Digital Signal Processor), or the like is used. Hereinafter, a transmission apparatus having program data or the like installed therein will be simply referred to as a transmission apparatus.

In some cases, regarding the plurality of functions of the transmission line interface, transmission apparatuses are released such that their functions are improved or added phase by phase depending on a delivery specified by users. In the following discussion, it is assumed that four levels of functions $A_0$, $A_1$, $A_2$, and $A_3$ are provided via four phases as follows:

$A_0$=basic functions;
$A_1$=$A_0$+additional functions ($a_1$);
$A_2$=$A_1$+additional functions ($a_2$); and
$A_3$=$A_2$+additional functions ($a_3$).

When the development the transmission apparatus is completed for all levels $A_0$ to $A_3$, there are transmission apparatuses of four grades (function levels) of $A_0$, $A_1$, $A_2$, and $A_3$ on the network.

In this situation, if it becomes necessary to unify the functions of the transmission apparatuses on the network to $A_3$, then transmission apparatuses with functions of $A_0$, $A_1$, or $A_2$ have to be upgraded to $A_3$. More specifically, transmission apparatuses having functions of $A_0$ are upgraded to have additional functions ($a_1$, $a_2$, and $a_3$), transmission apparatuses having functions of $A_1$ are upgraded to have additional functions ($a_2$ and $a_3$), and transmission apparatuses having functions of $A_2$ are upgraded to have additional functions ($a_3$).

As described above, the transmission apparatuses being operated on the network have a plurality of grades. In many cases, the upgrading is performed by changing the program data of the FPGA or the DSP disposed in each of the units to be upgraded or by changing the program data installed in the control unit that controls each of the units to be upgraded. However, because the transmission apparatuses on the network are different in grade, it is necessary to update the program data (firmware) differently depending on the transmission apparatuses, and thus the updating needs a complicated process.

As one of techniques to upgrade software, it has been proposed by Japanese Laid-open Patent Publication No. 2007-334636 to produce a difference file indicating the difference between an upgraded file and an upgrade file thereby to minimize the time needed to update the software depending on a system environment.

Note that the term "grade" is used to describe the function level realized.

Also note that the term "unit" is used to describe a PCB (Printed Circuit Board) implementing one of individual functions such as a transmission line interface function, a control function, etc.

SUMMARY

In a system in which transmission apparatuses having data such as program data installed therein are located on a network, the transmission apparatuses can have different grades depending on the status of the system. To upgrade the program data or the like, it is necessary to install data in the transmission apparatus, depending on the grade of the data installed in each transmission apparatus.

According to an aspect of an embodiment, an apparatus having data installed therein includes a data storage part for storing a (n+1)th-order file obtained by bundling an nth-order file and (n+1)th data corresponding to an (n+1)th function level into one file, wherein n is an integer, an identifier storage part for storing an identifier indicating a function level of data to be installed in the apparatus, and a controller for detecting the function level based on the identifier stored in the identifier storage part, de-bundling the (n+1)th-order file stored in the data storage part as many as times corresponding to the function level, and applying the de-bundled data to the apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram for an explanation of release levels including a newly added release level;

DESCRIPTION OF EMBODIMENTS

Figure 1:
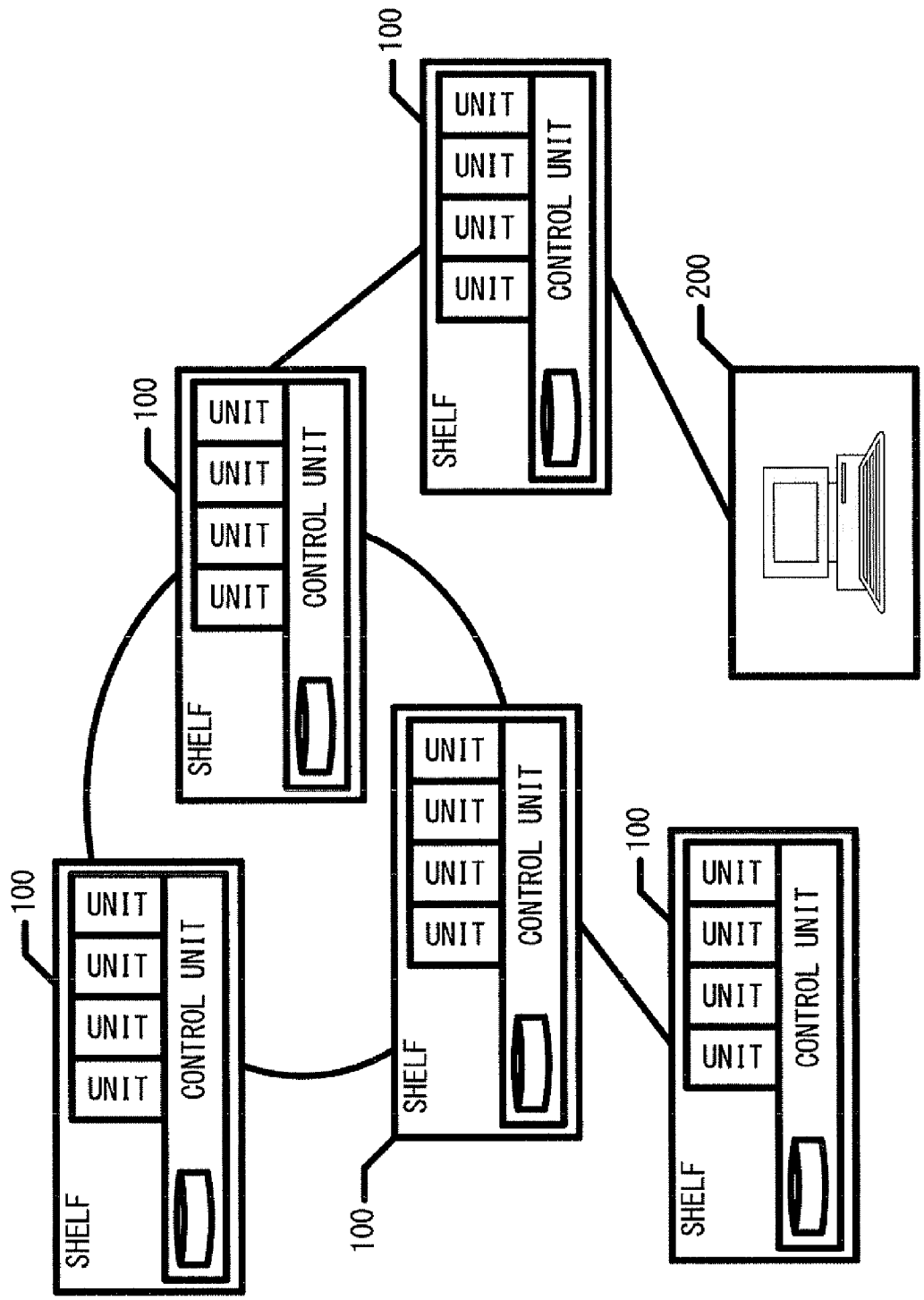
FIG. 1 is a diagram illustrating an example of a network configuration.

The embodiments are described in further detail below with reference to the accompanying drawings. Throughout the drawings, the same or similar elements are denoted by similar reference numerals.

In the following description, it is assumed, by way of example, the embodiments are applied to a transmission apparatus using an FPGA or a DSP. The program data or the like by which to realize the logical configuration and functional configuration of the FPGA or the DSP is stored in the form of firmware. Therefore, the data pack is implemented in the form of a firmware pack, and the data storage part is implemented in the form of a firmware storage part. The apparatus having data installed therein is implemented in the form of a transmission apparatus having firmware installed therein.

FIG. 1 illustrates an example of a configuration of a network including transmission apparatuses having firmware installed therein. In FIG. 1, reference numeral 100 denotes transmission apparatuses having firmware installed therein, and reference numeral 200 denotes a monitoring-and-controlling apparatus configured to monitor and control the transmission apparatuses 100 having firmware installed therein disposed on the network. Hereinafter, the transmission apparatus 100 having firmware installed therein is denoted simply as the transmission apparatus 100, and the monitoring-and-controlling apparatus 200 is denoted simply as the OpS 200.

Each transmission apparatus 100 includes, in each shelf, units configured to provide various functions such as a transmission line interface function, a transmission signal multiplexing/demultiplexing function, etc., and a control unit configured to monitor and control the units. In each unit of the transmission apparatuses 100, firmware is installed. In many cases, the grade of the firmware varies depending on the specifications requested by a user of the transmission apparatus 100 and/or depending on when transmission apparatus 100 is installed. That is, depending on when the transmission apparatus 100 is released, the release level, i.e., the grade, of the firmware installed in the transmission apparatus 100 is determined. In many cases, a release number is used as an identifier identifying the release level.

The OpS 200 monitors the transmission apparatuses 100 via the network and controls the transmission apparatuses 100 as required. For example, if the release level of the firmware is updated, a firmware pack corresponding to the updated release level is transmitted from the OpS 200 to the transmission apparatuses 100 via the network.

The firmware pack is a set of firmware for upgrading a plurality of types of units. The firmware pack is produced depending on the release level.

When the transmission apparatuses 100 are upgraded, a notification of the release level to be achieved by the upgrade is sent to the transmission apparatuses 100, and the upgrading is controlled.

The upgrading is a process of changing the release level of a transmission apparatus to a particular release level.

Figure 2:
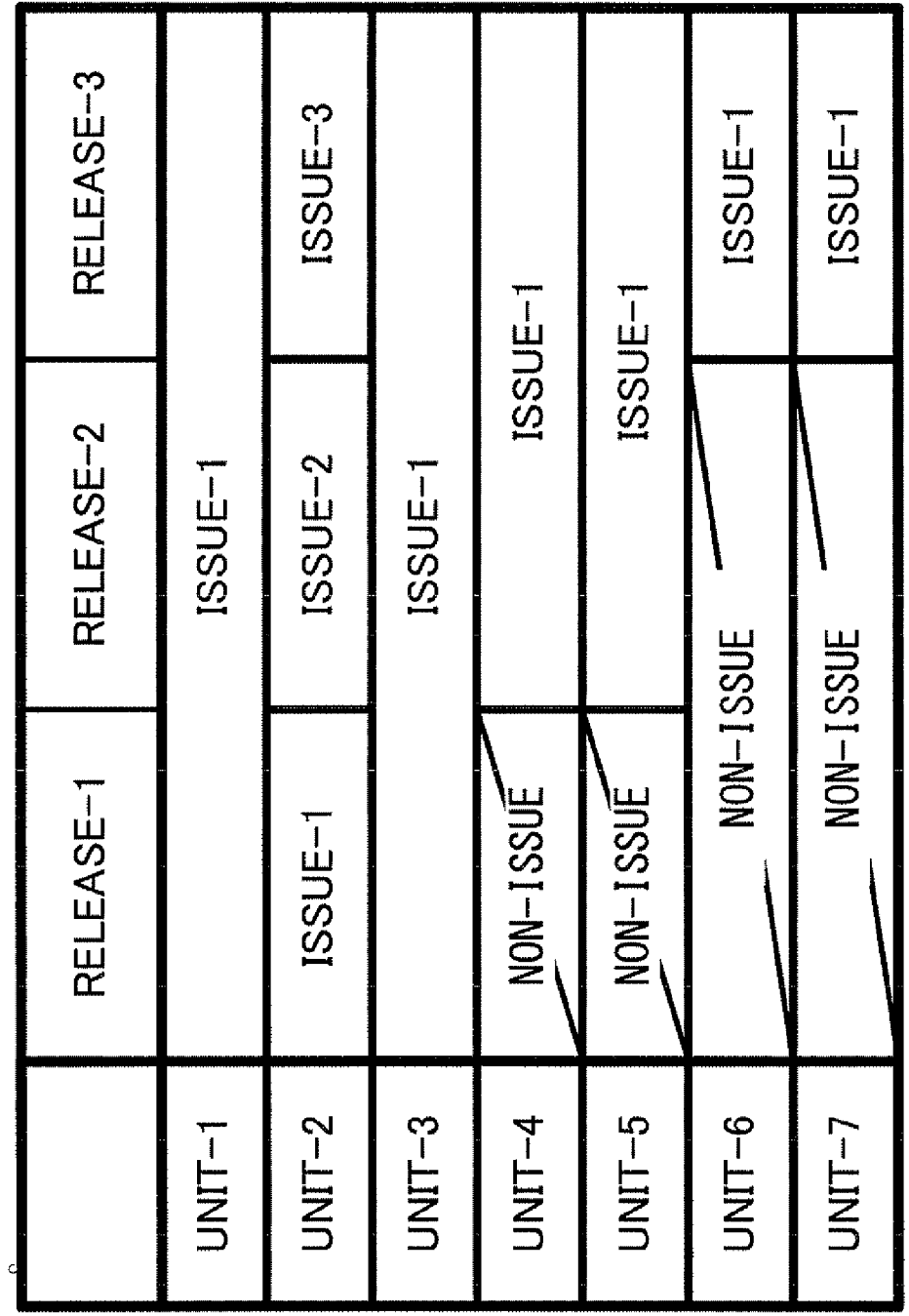
FIG. 2 is a diagram for an explanation of release levels.

FIG. 2 is a diagram for an explanation of release levels. In FIG. 2, UNIT-1 to UNIT-7 denote units installable in transmission apparatuses 100. The units UNIT-1 to UNIT-7 have a transmission line interface function, wherein the transmission line interface function varies depending on UNIT having different specifications. These units operate by different firmware. RELEASE-1 to RELEASE-3 denote release numbers of the respective transmission apparatuses 100. That is, RELEASE-1 to RELEASE-3 indicates function levels of the transmission apparatuses 100. RELEASE-1 indicates the version number of the firmware of the units released first, while RELEASE-3 indicates the version number of the firmware of the units released latest.

In RELEASE-1, the transmission apparatuses 100 support UNIT-1, UNIT-2, and UNIT-3, wherein the firmware installed in each of UNIT-1, UNIT-2, and UNIT-3 is of a version number ISSUE-1. In RELEASE-1, UNIT-4 to UNIT-7 are not supported.

Therefore, in fields at intersections of rows of UNIT-4 to UNIT-7 and a column of RELEASE-1, "Non-ISSUE" is described to indicate that there is no corresponding firmware.

In RELEASE-2, the transmission apparatuses 100 support UNIT-4 and UNIT-5 in addition to UNIT-1 to UNIT-3. In this release level, i.e., function level, the version number of the firmware installed in UNIT-1 and UNIT-3 remains at ISSUE-1, while the firmware installed in UNIT-2 is changed to ISSUE-2. Firmware of version ISSUE-1 is installed in UNIT-4 and UNIT-5. UNIT-6 and UNIT-7 have no firmware and thus "Non-ISSUE" is described in corresponding fields.

In RELEASE-3, the transmission apparatuses 100 newly support UNIT-6 and UNIT-7 in addition to UNIT-1 to UNIT-5. In this release level, i.e., function level, the versions of the firmware installed in units UNIT-1 and UNIT-3 to UNIT-5 remain at ISSUE-1, while the firmware installed in UNIT-2 is changed to ISSUE-3, and firmware of ISSUE-1 is installed in UNIT-6 and UNIT-7.

First Embodiment

In this embodiment, a description is given as to a firmware pack produced by bundling a set of firmware with different release levels into one file on a level-by-level basis, and also as to unpacking of the firmware pack to obtain firmware of a particular release level.

Figure 3:
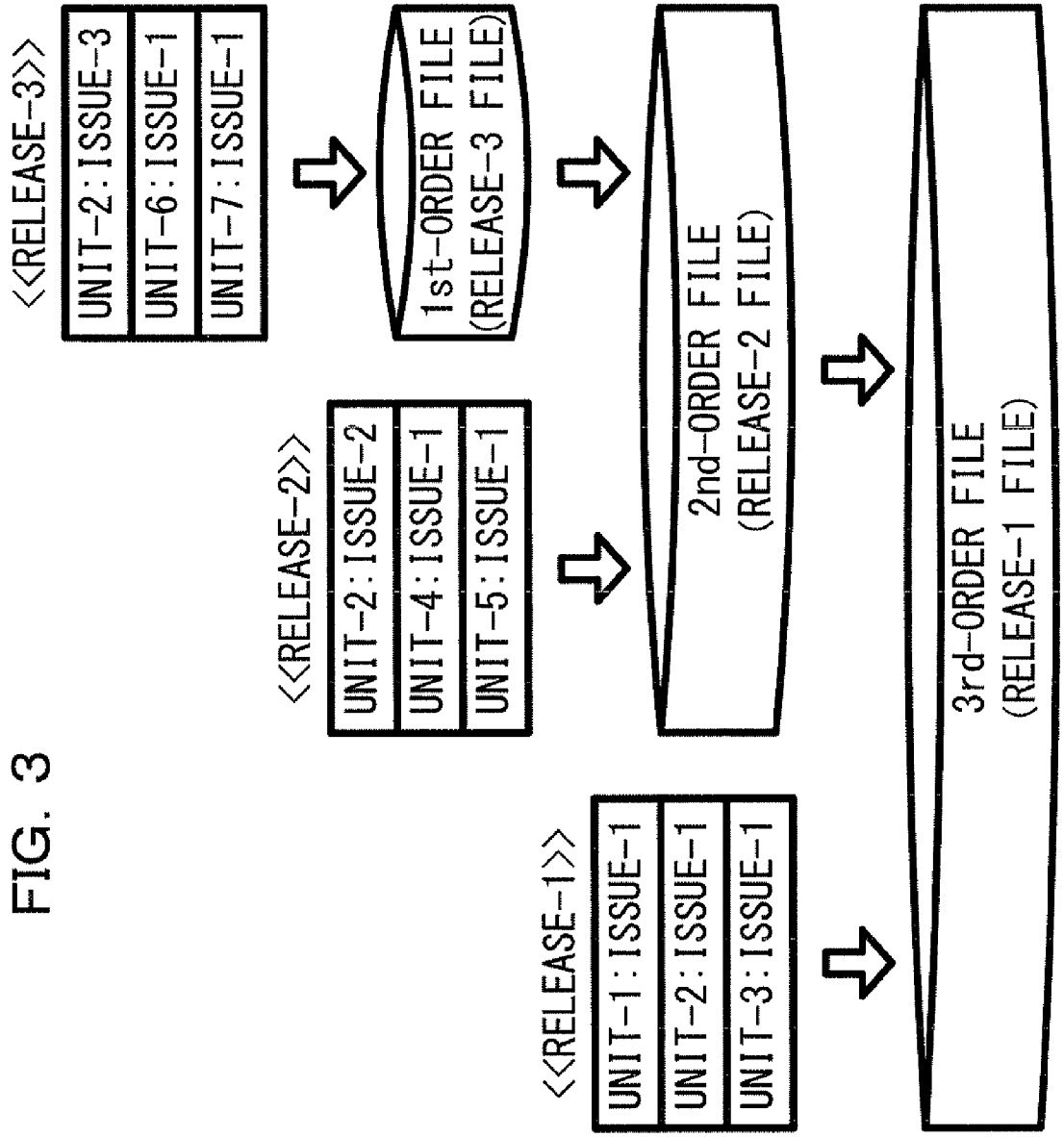
FIG. 3 is a diagram for an explanation of packing of firmware.

FIG. 3 is a diagram for an explanation of a firmware pack. In the state, shown in FIG. 2, of the release level of transmission apparatuses 100, a firmware pack is produced by bundling the set of firmware into one file depending on the release level, as described in detail below.

A firmware pack is produced by bundling a set of changed or added firmware that is of a latest release level (release number: RELEASE-3) as of the time at which the firmware pack is produced. More specifically in this specific example, firmware of UNIT-2 of ISSUE-3, firmware of UNIT-6 of ISSUE-1, and firmware of UNIT-7 of ISSUE-1 are bundled into one file.

A plurality of pieces of firmware may be bundled, for example, by using archiving software (also called an archiver). This process of bundling the plurality of pieces of firmware can be said to encapsulate the plurality of pieces of firmware (data) into one file.

When the bundling into one file is performed, data compression may be performed.

A RELEASE-3 file produced by bundling one or more pieces of firmware updated in RELEASE-3 or firmware corresponding to UNITs newly added in RELEASE-3 into one file is defined as a first-order file.

A plurality of pieces of firmware updated or newly added in the next-newest release level (with a release number RELEASE-2), i.e., firmware of UNIT-2 of ISSUE-2, firmware of UNIT-4 of ISSUE-1, and firmware of UNIT-5 of ISSUE-1 and the first-order file of RELEASE-3 are bundled into one file. This file produced by bundling the first-order file and firmware released in RELEASE-2 is defined as a second-order file.

A plurality of pieces of firmware updated or newly added in the third-newest release level (with a release number RELEASE-1), i.e., in this specific example, first-released firmware of UNIT-1 of ISSUE-1, firmware of UNIT-2 of ISSUE-1, and firmware of UNIT-3 of ISSUE-1 and the second-order file are bundled into one file. This file produced by bundling the second-order file and firmware released in RELEASE-1 is defined as a third-order file.

At the point of time when RELEASE-3 is released, the firmware pack is given in the form of the third-order file produced in the above-described manner.

Figure 4:
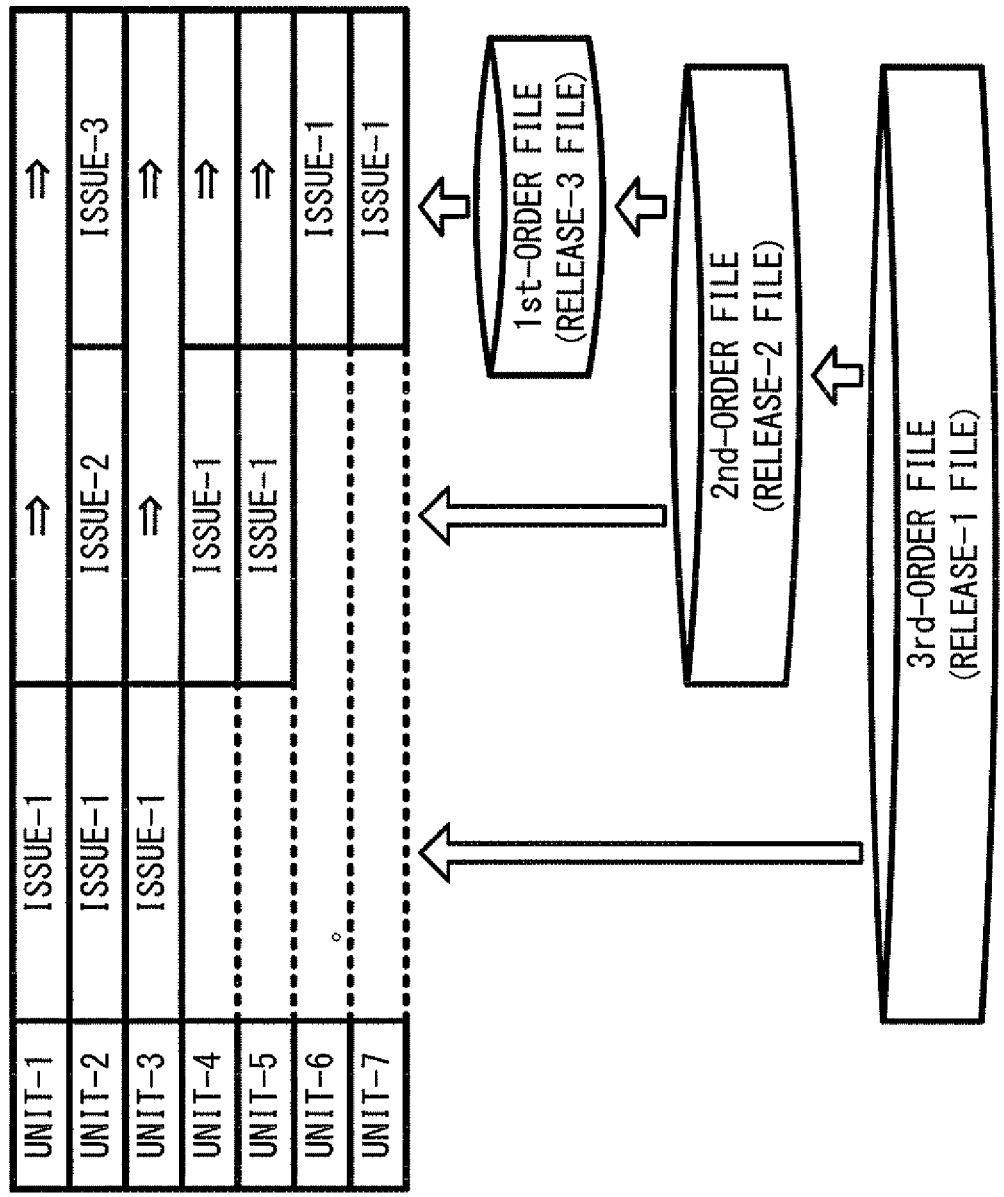
FIG. 4 is a diagram for an explanation of unpacking of a firmware pack.

FIG. 4 is a diagram for an explanation of unpacking of a firmware pack. The firmware pack described above with reference to FIG. 3 is unpacked as follows. The unpacking is a process inverse to the above-described process of bundling of firmware. That is, the unpacking is a process of extracting the original set of firmware or a lower-order packed file from the bundled firmware (the packed file). In other words, the unpacking is a process of decapsulating the file to extract individual pieces of firmware (data) or capsulated files.

By unpacking the firmware pack of the third-order file once, it is possible to extract each piece of firmware of the set of firmware released first (with the release number RELEASE-1) and the second-order file.

That is, the firmware corresponding to UNIT-1 of ISSUE-1, UNIT-2 of ISSUE-1, and UNIT-3 of ISSUE-1 are obtained.

If the firmware pack of the third-order file is unpacked twice, the second-order file is unpacked and thus the set of firmware changed or added in the second release (with the release number RELEASE-2) and the third-order file are obtained.

That is, UNIT-2 of ISSUE-2, UNIT-4 of ISSUE-1, and UNIT-5 of ISSUE-1 of RELEASE-2 are further obtained, and thus, as a whole, UNIT-1 remains at ISSUE-1, UNIT-2 is overwritten by ISSUE-2, UNIT-3 remains at ISSUE-1, and UNIT-4 and UNIT-5 of ISSUE-1 are obtained.

The overwriting of UNIT-2 by ISSUE-2 is explained in further detail below.

In the following explanation, it is assumed that the firmware of each unit is assigned the same file name for all versions of ISSUE. For example, as for UNIT-2, when the first unpacking is performed, the firmware of ISSUE-1 is installed in UNIT-2. When the second unpacking is performed, the firmware of ISSUE-2 is obtained as a result. In this case, the firmware of UNIT-2 of ISSUE-1 is overwritten by the firmware with the same file name of a newer version, i.e., the firmware of ISSUE-2. Such overwriting is achieved by properly setting the archiving software used in the unpacking process. Thus, as a result of the second unpacking operation, the firmware of ISSUE-2 of RELEASE-2 is obtained as the firmware for UNIT-2.

If the firmware pack of the third-order file is unpacked three times, the firmware pack is unpacked to the first-order file, and thus the set of firmware changed or added in the third release (with the release number RELEASE-3) is obtained.

That is, UNIT-2 of ISSUE-3, UNIT-6 of ISSUE-1, and UNIT-7 of ISSUE-1 are further obtained, and thus, as a whole, UNIT-1 remains at ISSUE-1, UNIT-2 is overwritten by ISSUE-3, UNIT-3 remains at ISSUE-1, UNIT-4 remains at ISSUE-1, UNIT-5 remains at ISSUE-1, and UNIT-6 and UNIT-7 of ISSUE-1 are obtained.

Next, an explanation is give below as to an example of a process of upgrading the transmission apparatuses 100 located on the network shown in FIG. 1 by using the third-order file configured in the above-described manner.

The OpS 200 produces the third-order file shown in FIG. 3. The resultant third-order file is supplied to the control unit of each of all transmission apparatuses 100 by using a monitor/control path (not shown).

The control unit of each transmission apparatus 100 manages the release level of the transmission apparatus 100, and has a capability of keeping information indicating a release level to be applied next to the apparatus.

More specifically, if one of the transmission apparatuses 100 receives, from the OpS 200 or a terminal connected to the control unit, a notification indicating that the release level to be applied next to the apparatus is RELEASE-2, the transmission apparatus 100 keeps this information.

In this state, if the control unit of this transmission apparatus 100 receives the third-order file, the control unit unpacks the received file twice. As a result, the firmware of RELEASE-2 is obtained. The control unit applies the obtained firmware to the respective units such that the respective units have functions of the level of RELEASE-2.

When another one of transmission apparatuses 100 has information indicating that the function level applied next is RELEASE-3, if the control unit of this transmission apparatus 100 receives the third-order file, the control unit unpacks the received third-order file three times. As a result, the firmware of RELEASE-3 is obtained. The control unit applies the obtained firmware to the respective units such that the respective units have functions of the specified level, i.e., the level of RELEASE-3 in this specific case.

As described above, the OpS 200 supplies the same file to all transmission apparatuses 100. If each transmission apparatus 100 receives the file, the transmission apparatus 100 unpacks the received file a particular number of times corresponding to the function level required for the transmission apparatus 100 to obtain firmware of a correct function level for the respective units in the transmission apparatus 100.

In the present embodiment, a set of a plurality of pieces of firmware that are different in release level is bundled on a level-by-level basis starting from a latest release level into one firmware pack, and the resultant single firmware pack is supplied to all transmission apparatuses. In this technique, it is not necessary to produce a plurality of types of files depending on release levels even in a case where release levels are different depending on the specific transmission apparatuses. Furthermore, it is possible to easily obtain a set of firmware of a desired release level simply by unpacking the firmware pack depending on the desired release level.

Second Embodiment

In a second embodiment described below, an explanation is given as to a process of installing firmware extracted from a firmware pack into units when a transmission apparatus 100 is set up for operation.

Figure 5:
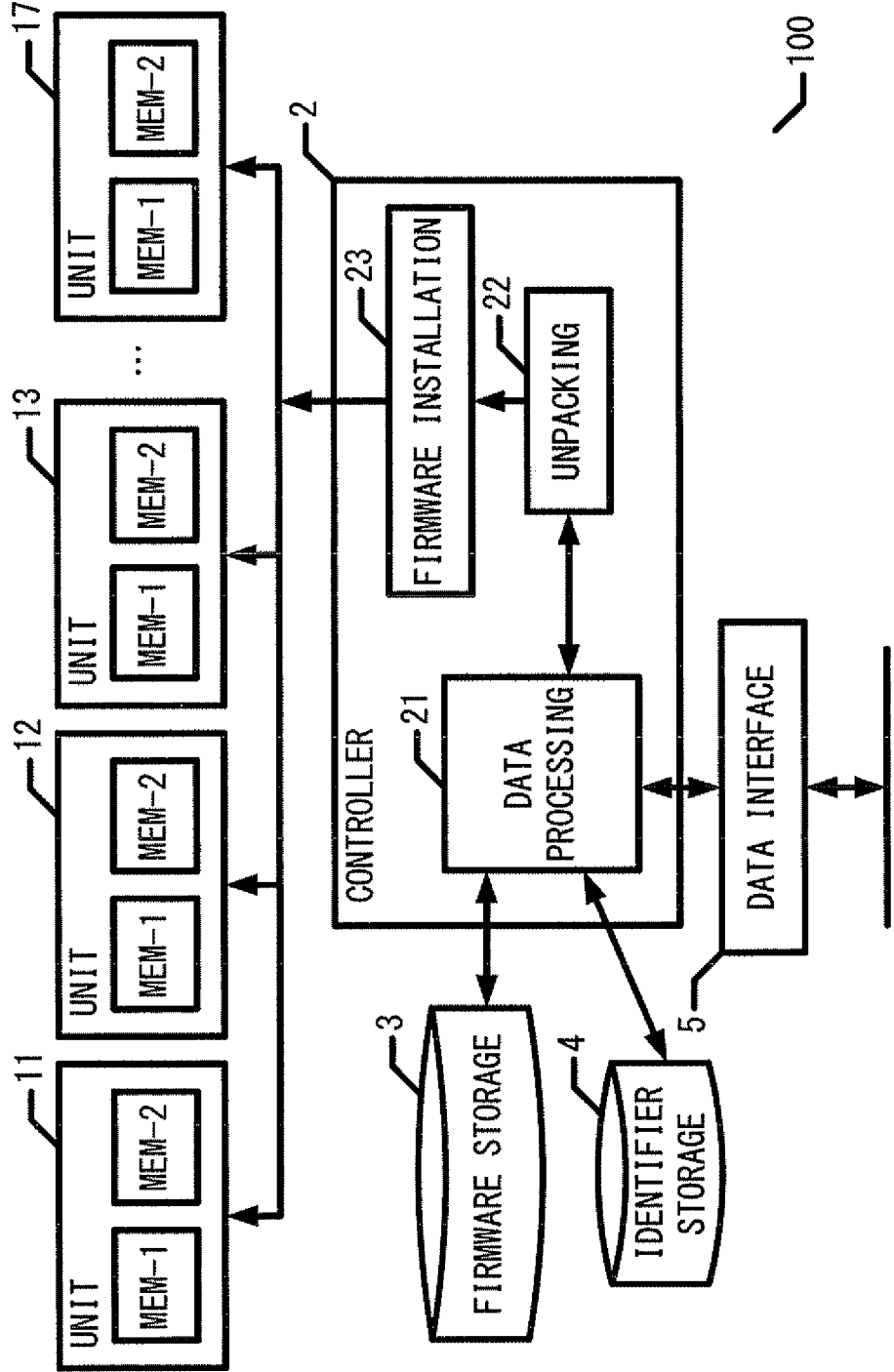
FIG. 5 is a diagram schematically illustrating functions of an apparatus having firmware installed therein.

FIG. 5 is a diagram schematically illustrating functions of a transmission apparatus 100 having firmware installed therein. In FIG. 5, reference numerals 11 to 17 denote units each having a transmission line interface function and having MEM-1 and MEM-2 for storing firmware. For example, firmware of an FPGA is stored in MEM-1, and firmware of a DSP is stored in MEM-2. Units 11 to 17 correspond to units UNIT-1 to UNIT-7 described above with reference to FIG. 3 or 4. When units 11 to 17 are generically referred to, an expression "unit 10" is used. Reference numeral 2 denotes a controller that controls upgrading of the firmware installed in each unit 10. Reference numeral 3 denotes a firmware storage part for storing a firmware pack and unpacked firmware described above with reference to FIG. 3. Reference numeral 4 denotes an identifier storage part for storing a release identifier (for example, a release number) identifying a release level of a particular transmission apparatus 100. Using this release identifier, it is possible to detect the grade of a set of firmware installed in each transmission apparatus 100. Reference numeral 5 denotes a data interface part configured to transmit/receive data to/from the OpS 200 via an Ethernet (registered trademark) network or the like. The data interface part 5 is also used to transmit/receive data to/from a maintenance terminal. The control unit described above with reference to FIG. 1 has the controller 2, the firmware storage part 3, the identifier storage part 4, and the data interface part 5.

The controller 2 includes a data processing part 21, an unpacking part 22, and a firmware installation part 23.

When the firmware is installed in the unit 10, the data processing part 21 reads the firmware pack and the release identifier respectively from the firmware storage part 3 and the identifier storage part 4, and controls the unpacking part 22 to unpack the read firmware pack into the release level specified by the release identifier. Furthermore, the data processing part 21 controls the process to store the unpacked firmware pack and the firmware in the firmware storage part 3. When the unpacking is performed for upgrading, the data processing part 21 controls the process so as to store the release identifier of the new release level in the identifier storage part 4. When the release level of the firmware installed in the transmission apparatus 100 is updated, the data interface part 5 receives a newest firmware pack transmitted from the OpS 200 to the transmission apparatus 100 via the network, and the data processing part 21 stores the received firmware pack in the firmware storage part 3.

The unpacking part 22 unpacks the firmware pack according to the release level. The obtained firmware and the unpacked firmware pack are stored in the firmware storage part 3 under the control of the data processing part 21.

The firmware installation part 23 installs the firmware unpacked by the unpacking part 22 into the MEM-1 and the MEM-2 of the unit 10.

In the present embodiment, it is assumed that the firmware pack of the third-order file shown in FIG. 3 is stored in the firmware storage part 3, and the transmission apparatus 100 is operated with the release level RELEASE-2 according to the request by a user and thus the release identifier indicating RELEASE-2 is stored in the identifier storage part 4.

Figure 6:
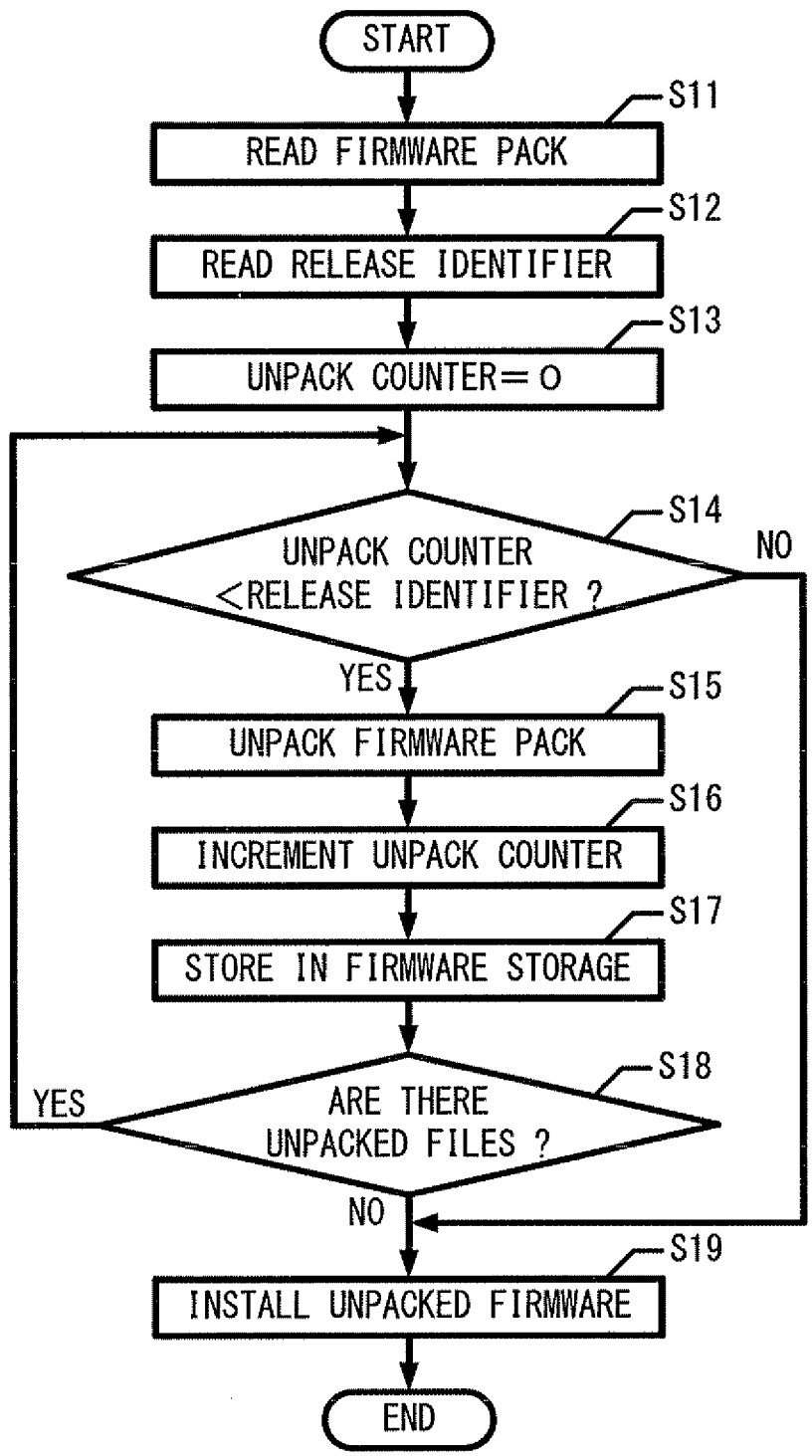
FIG. 6 is a flow chart illustrating an example of a process of unpacking a firmware pack.

FIG. 6 is a flow chart illustrating a first example of a process of unpacking a firmware pack. This process starts when a firmware installation command issued by the maintenance terminal is received via the data interface part 5 shown in FIG. 5.

In step S11, the data processing part 21 reads the firmware pack (the third-order file) stored in the firmware storage part 3.

In step S12, the data processing part 21 reads the release identifier (release number: RELEASE-2) identifying the release level of the transmission apparatus 100 from the identifier storage part 4.

In step S13, the data processing part 21 sets the unpack counter disposed in the data processing part 21 to "0".

In step S14, to determine the release level to which unpacking should be performed, a comparison is made between the unpack counter value and the release identifier. In the case where the release identifier is given by the release number, if the unpack counter value is smaller than the release number, the processing flow proceeds to step S15. On the other hand, if the unpack counter value is equal to or greater than the release number, it is determined that the unpacking has been performed until the firmware of the release level required for the transmission apparatus 100 has been obtained, and thus the process proceeds to step S19.

In step S15, the firmware pack is unpacked. In this specific case, as explained above with reference to FIG. 4, the third-order file is unpacked, and thus firmware of ISSUE-1 for UNIT-1, UNIT-2, and UNIT-3 and the second-order file are obtained.

In step S16, the unpack counter is incremented. More specifically, in this case, the unpack counter has a value of "1" as a result of the incrementing.

In step S17, the firmware of each of the UNIT-1, UNIT-2, and UNIT-3 unpacked in step S16 is stored in the firmware storage part 3.

In step S18, a determination is made as to whether there are more unpacked files. In this specific case, the third-order file has been unpacked in the immediately previous step, and thus there is a second-order file. Thus, the processing flow proceeds to step S14.

Thereafter, the process described above is repeated until the firmware of the release level (release number: RELEASE-2) required for the transmission apparatus 100 is obtained, as described below.

In step S14, the unpack counter has a value of "1", and thus the unpack counter value is smaller than the release identifier (release number RELEASE-2). Therefore, the processing flow proceeds to step S15.

In step S15, the firmware pack is unpacked. In this specific case, as explained above with reference to FIG. 4, the second-order file is unpacked and the firmware of UNIT-2 of ISSUE-2, UNIT-4 of ISSUE-1, and UNIT-5 of ISSUE-1 and the first-order file are obtained.

In step S16, the unpack counter is incremented. As a result, the unpack counter has a value of "2".

In step S17, the firmware of each of the UNIT-2, UNIT-4, and UNIT-5 unpacked in immediately previous step S16 is stored in the firmware storage part 3. In the firmware storage part 3, the firmware of UNIT-2 is overwritten, and thus the version thereof is changed from ISSUE-1 to ISSUE-2.

In step S18, a determination is made as to whether there are more unpacked files. In this specific case, the second-order file has been unpacked in the immediately previous step, and thus there is a first-order file. Thus, the processing flow proceeds to step S14.

In step S14, in this case, the unpack counter has a value of "2" and thus the unpack counter value is equal to the release identifier (release number: RELEASE-2). As a result, the processing flow proceeds to step S19.

In step S19, because the unpacking has been performed until the firmware of the released level (the release number: RELEASE-2) required for the present transmission apparatus 100 is obtained, the data processing part 21 reads the set of firmware stored in the firmware storage part 3 and transmits it to the firmware installation part 23. The firmware installation part 23 installs the unpacked firmware into the respective units 10 that need the firmware. More specifically, in this specific case, the firmware of ISSUE-1 is installed in units UNIT-1, UNIT-3, UNIT-4, and UNIT-5, and the firmware of ISSUE-2 is installed in the unit UNIT-2.

In the present embodiment, the firmware pack is unpacked as many times as necessary to obtain the firmware of the function level (the release level) required for the transmission apparatus 100, and the obtained firmware is installed in the units 10 that need the firmware. The firmware obtained by unpacking the firmware pack and the unpacked nth-order file (the first-order file, in this specific case) are stored in the firmware storage part 3 for backup.

Third Embodiment

When a change or an addition occurs in the firmware installed in the transmission apparatus 100, that is, when a change occurs in the release level, a maintenance person transmits a latest firmware pack from the OpS 200 to the transmission apparatuses 100. Each transmission apparatus 100 receives the transmitted firmware pack via the data interface part 5. The data processing part 21 unpacks the received firmware pack to obtain firmware of the release level indicated by the release identifier.

Figure 7:
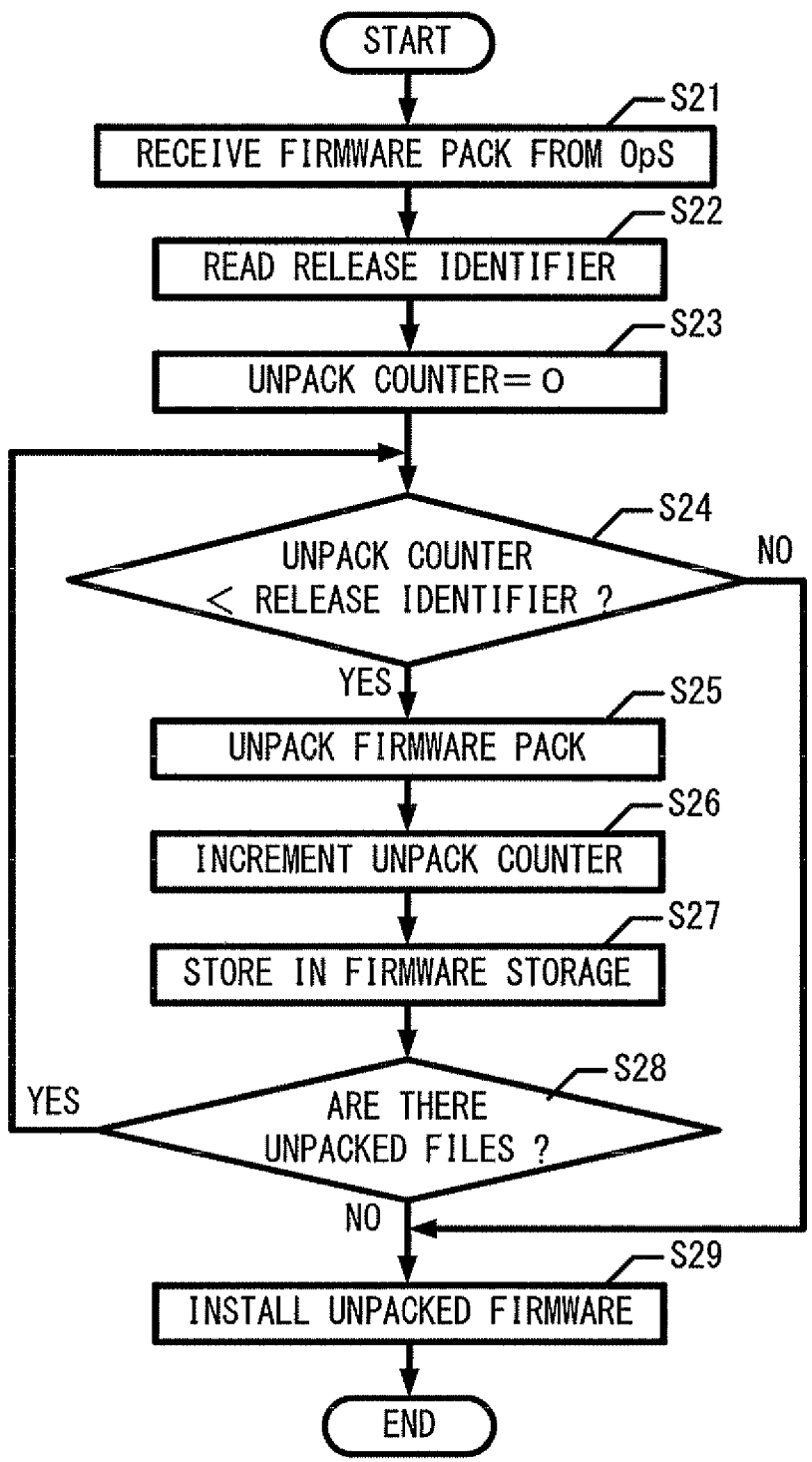
FIG. 7 is a flow chart illustrating an example of a process of unpacking a firmware pack received from a monitoring-and-controlling apparatus.

FIG. 7 is a flow chart illustrating a second example of a process of unpacking a firmware pack received from the OpS 200.

FIG. 8 is a diagram for an explanation of release levels including a newly added release level. In this example, RELEASE-4 is added to the release levels shown in FIG. 2. In RELEASE-4, the version of the firmware installed in UNIT-2 is updated to ISSUE-4, and the versions of the firmware installed in UNIT-6 and UNIT-7 are updated to ISSUE-2. No change occurs in the versions of the firmware installed in the other units, and they remain in ISSUE-1 as in the case shown in FIG. 2.

Figure 9:
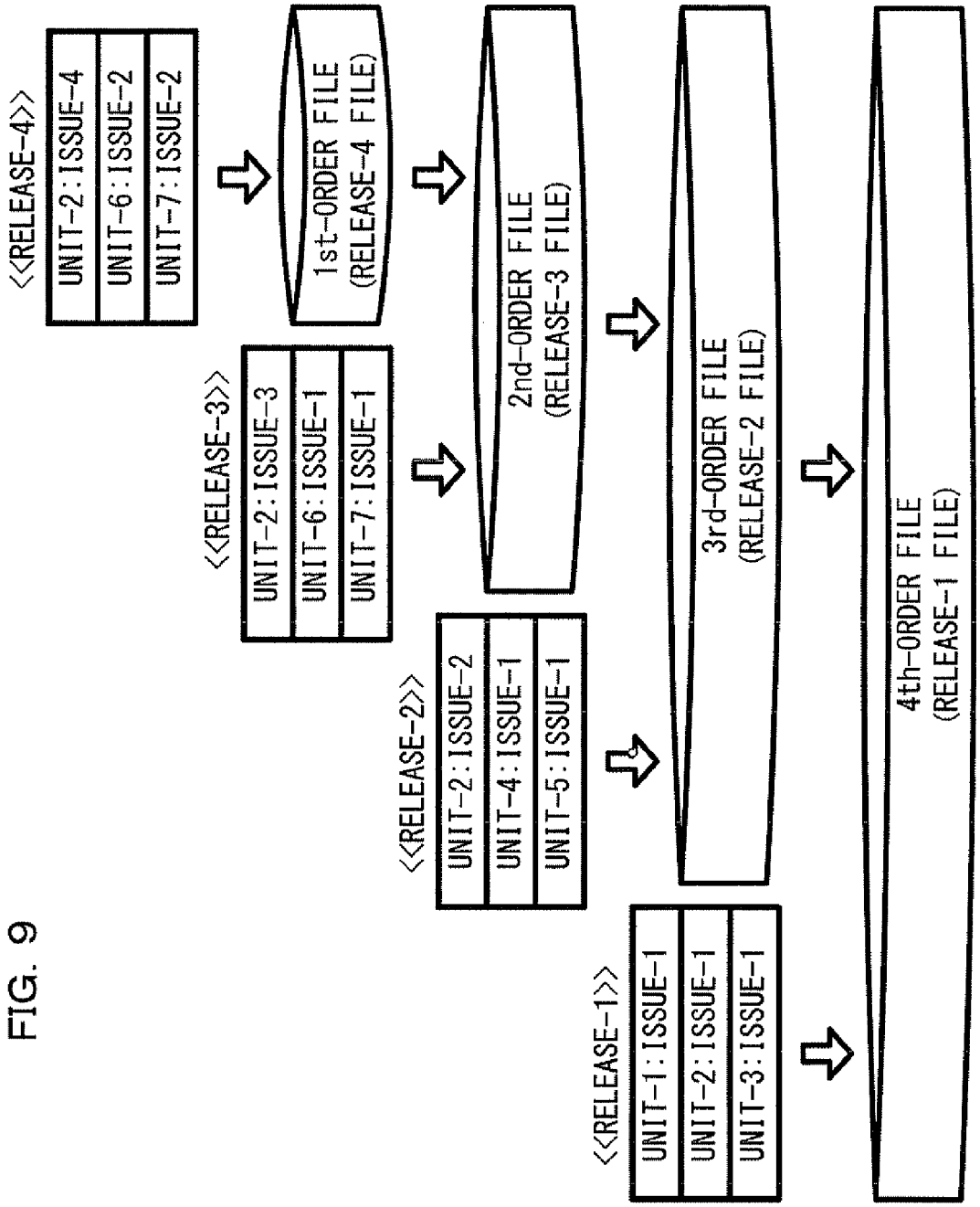
FIG. 9 is a diagram illustrating an example of a firmware pack including firmware of a newly added release level.

FIG. 9 illustrates an example of a firmware pack including firmware of a newly added release level. As in the case shown in FIG. 3, firmware updated or added in a release level (release number: RELEASE-4) latest as of a point of time when the firmware pack is produced, i.e., firmware of UNIT-2 of ISSUE-4, firmware of UNIT-6 of ISSUE-2, and firmware of UNIT-7 of ISSUE-2 are bundled into one file.

A plurality of pieces of firmware may be bundled, for example, by using archiving software (also called an archiver). This process of bundling the plurality of pieces of firmware can be said to encapsulate the plurality of pieces of firmware (data) into one file.

When the bundling into one file is performed, data compression may be performed.

This file produced by bundling the firmware updated in RELEASE-4 is defined as a first-order file.

Next, firmware updated or added in a next latest release level (release number: RELEASE-3), i.e., firmware of UNIT-2 of ISSUE-3, a firmware of UNIT-6 of ISSUE-1, and firmware of UNIT-7 of ISSUE-1 and the first-order file of RELEASE-4 are bundled into one file. This file produced by bundling the first-order file and firmware released in RELEASE-3 is defined as a second-order file.

Thereafter, as in the case shown in FIG. 3, a third-order file of RELEASE-2 is produced and a fourth-order file of RELEASE-1 is further produced. As a result, a firmware pack is finally obtained.

Referring to FIG. 7, a process of unpacking a firmware pack transferred from the OpS 200 is explained below. In the following explanation, it is assumed by way of example that when the firmware pack is transferred from the OpS 200, the release level (the release number) of the firmware installed in the transmission apparatus 100 is RELEASE-2 shown in FIG. 8.

Figure 10:
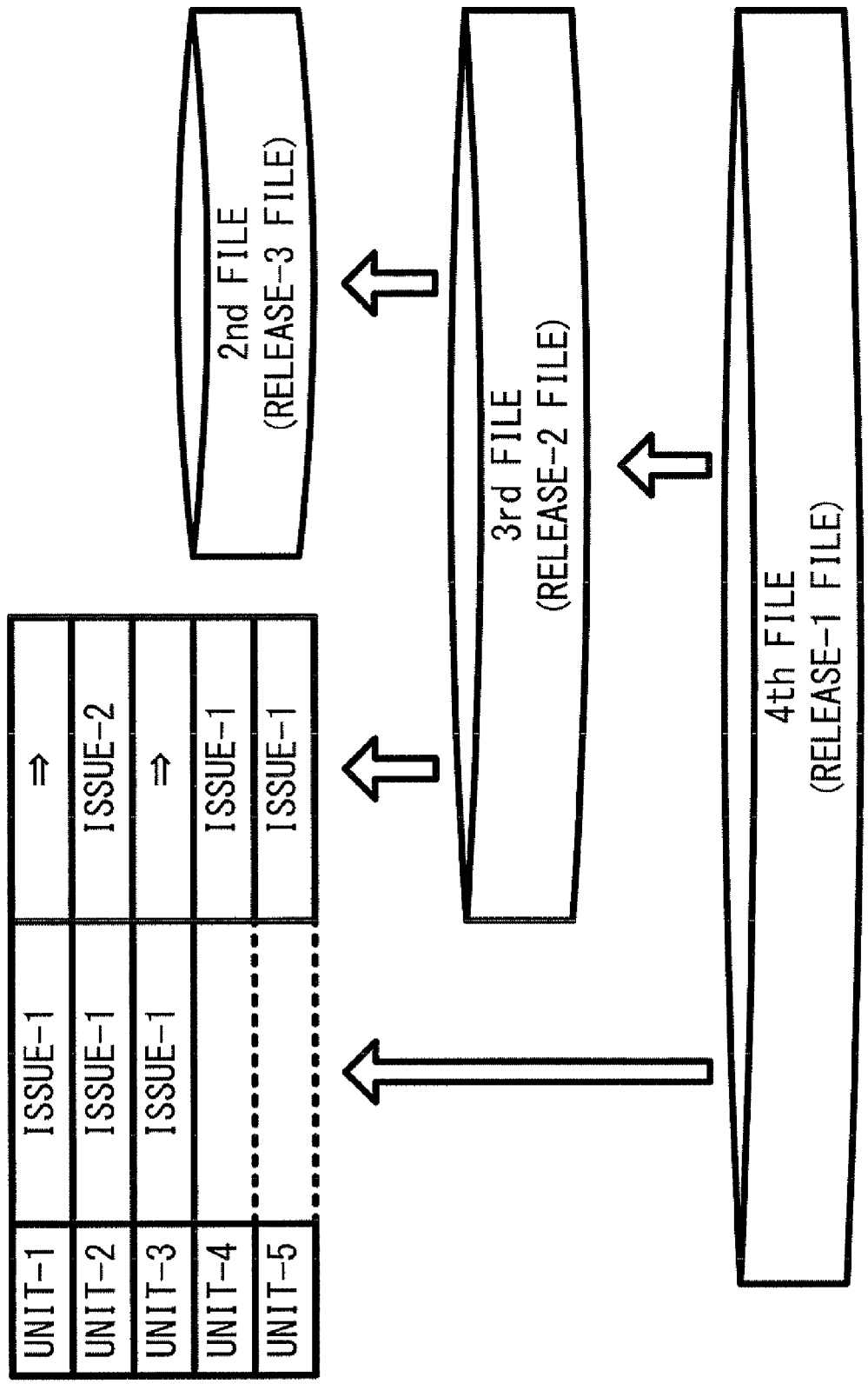
FIG. 10 is a diagram illustrating an example of a process of unpacking a firmware pack including firmware of a newly added release level.

FIG. 10 illustrates a second example of a process of unpacking a firmware pack including firmware of a newly added release level. In this figure, the firmware pack is in a state in which unpacking has been performed until firmware of RELEASE-2 is obtained.

In step S21, if the data interface part 5 receives the firmware pack from the OpS 200, the data interface part 5 transfers it to the data processing part 21.

In step S22, the data processing part 21 reads the release identifier (release number: RELEASE-2) identifying the release level of the transmission apparatus 100 from the identifier storage part 4.

In step S23, the data processing part 21 sets the unpack counter disposed in the data processing part 21 to "0".

In step S24, to determine the release level to which unpacking should be performed, a comparison is made between the unpack counter value and the release identifier. In the case where the release identifier is given by the release number, if the unpack counter value is smaller than the release number, the processing flow proceeds to step S25. On the other hand, if the unpack counter value is equal to or greater than the release number, it is determined that the unpacking has been performed until the firmware of the release level required for the transmission apparatus 100 has been obtained, and thus the process proceeds to step S29.

In step S25, the firmware pack is unpacked. In this specific case, as shown in FIG. 10, the fourth-order file is unpacked, and thus firmware of ISSUE-1 for UNIT-1, UNIT-2, and UNIT-3 and the second-order file are obtained.

In step S26, the unpack counter is incremented. As a result, the unpack counter has a value of "1".

In step S27, the firmware of each of the UNIT-1, UNIT-2, and UNIT-3 unpacked in step S26 is stored in the firmware storage part 3 such that the currently used firmware stored in the firmware storage part is overwritten.

In step S28, a determination is made as to whether there are more unpacked files. In this specific case, the fourth-order file has been unpacked in the immediately previous steps and thus there is a third-order file. Thus, the processing flow proceeds to step S24.

Thereafter, the process described above is repeated until the firmware of the release level (release number: RELEASE-2) required for the transmission apparatus 100 is obtained as described below.

In step S24, the unpack counter has a value of "1", and thus the unpack counter value is smaller than the release identifier (release number RELEASE-2). Therefore, the processing flow proceeds to step S25.

In step S25, the firmware pack is unpacked. In this specific case, as shown in FIG. 10, the third-order file is unpacked, and thus the firmware corresponding to UNIT-2 of ISSUE-2, UNIT-4 of ISSUE-1, and UNIT-5 of ISSUE-1 and the second-order file are obtained.

In step S26, the unpack counter is incremented. More specifically, in this case, the unpack counter has a value of "2".

In step S27, the firmware of each of the UNIT-2, UNIT-4, and UNIT-5 unpacked in immediately previous step S26 is stored in the firmware storage part 3 such that the currently used firmware stored in the firmware storage part is overwritten.

In step S28, a determination is made as to whether there are more unpacked files. In this specific case, the third-order file has been unpacked in the immediately previous step, and thus there is a second-order file. Thus, the processing flow proceeds to step S24.

In step S24, in this case, the unpack counter has a value of "2" and thus the unpack counter value is equal to the release identifier (release number: RELEASE-2). As a result, the processing flow proceeds to step S29.

In step S29, because the unpacking has been performed until the firmware of the released level (the release number: RELEASE-2) required for the present transmission apparatus 100 is obtained, the data processing part 21 reads the set of firmware stored in the firmware storage part 3 and transmits it to the firmware installation part 23. The firmware installation part 23 installs the unpacked firmware into the respective units 10 that need the firmware. In this specific case, the firmware of ISSUE-1 is installed in units UNIT-1, UNIT-3, UNIT-4, and UNIT-5, and the firmware of ISSUE-2 is installed in the unit UNIT-2 in an overwritten form.

In the present embodiment, when a newest firmware pack is supplied to the transmission apparatus 100 from the OpS 200, the firmware pack is unpacked to extract firmware of a release level required for the transmission apparatus 100. The extracted firmware is installed in the units 10 in an overwritten form. Furthermore, as shown in FIG. 10, the firmware pack obtained by unpacking the firmware pack and the nth-order file (the second-order file in this specific example) that has not yet been unpacked are stored for backup in the firmware storage part 3.

Fourth Embodiment

In some cases, in operation of a transmission apparatus 100, an improvement in existing function or an addition of a new transmission line interface function is performed. To achieve such an improvement in function, it is necessary to install upgraded firmware in a corresponding unit. That is, it is necessary to upgrade the firmware.

In the following explanation of the present embodiment, it is assumed by way of example that the transmission apparatuses 100 are currently operated at the function levels described below as in the example of the third embodiment. That is, in order to operate the transmission apparatuses 100 at a release level with a release number RELEASE-2, a firmware pack of a release level with a release number RELEASE-4 supplied from the OpS 200 is unpacked, and the unpacked firmware is installed in units UNIT-1 to UNIT-5. A second-order file that is in an unpacked state is stored in the firmware storage part 3.

Figure 11:
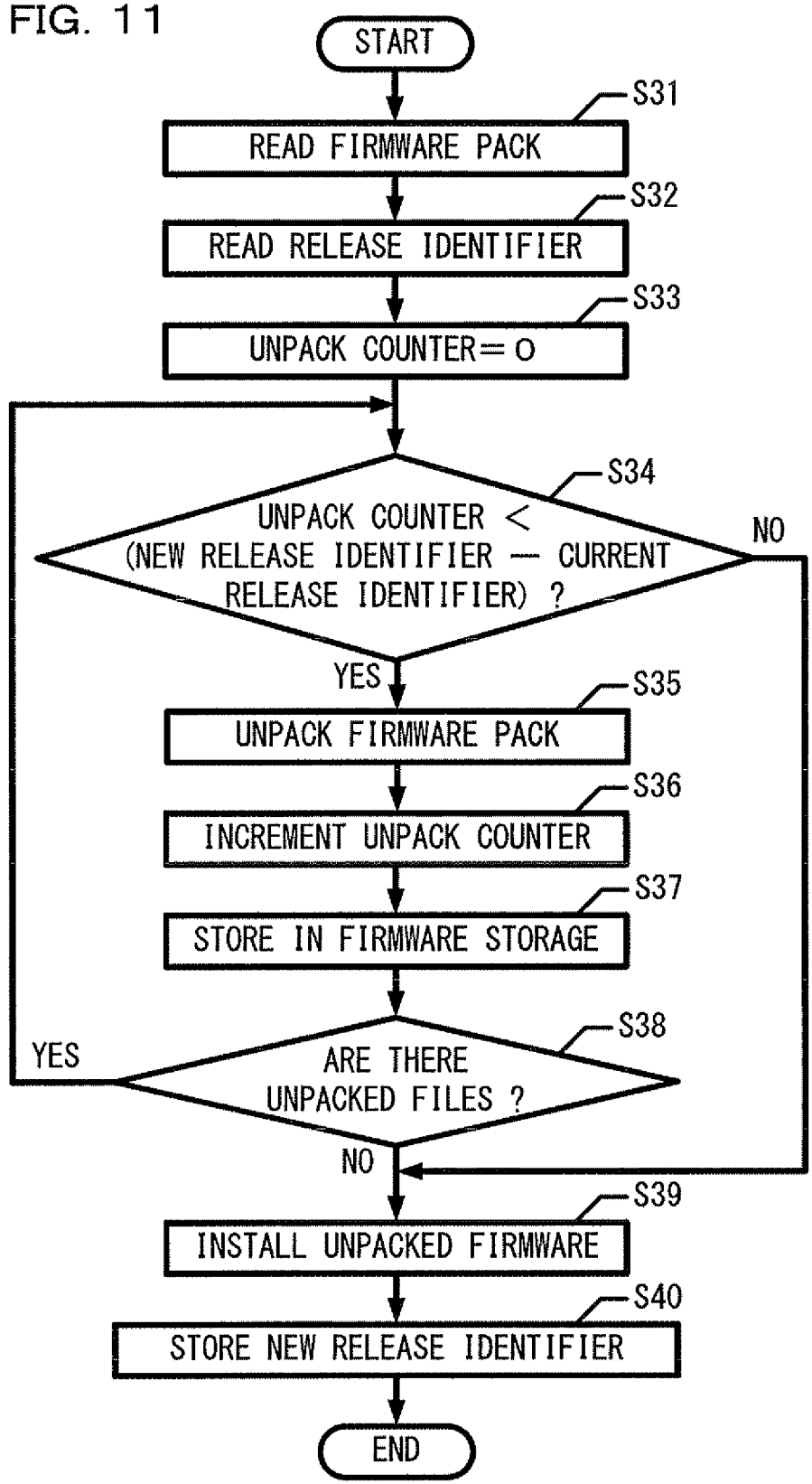
FIG. 11 is a flow chart illustrating an upgrading process.
Figure 12:
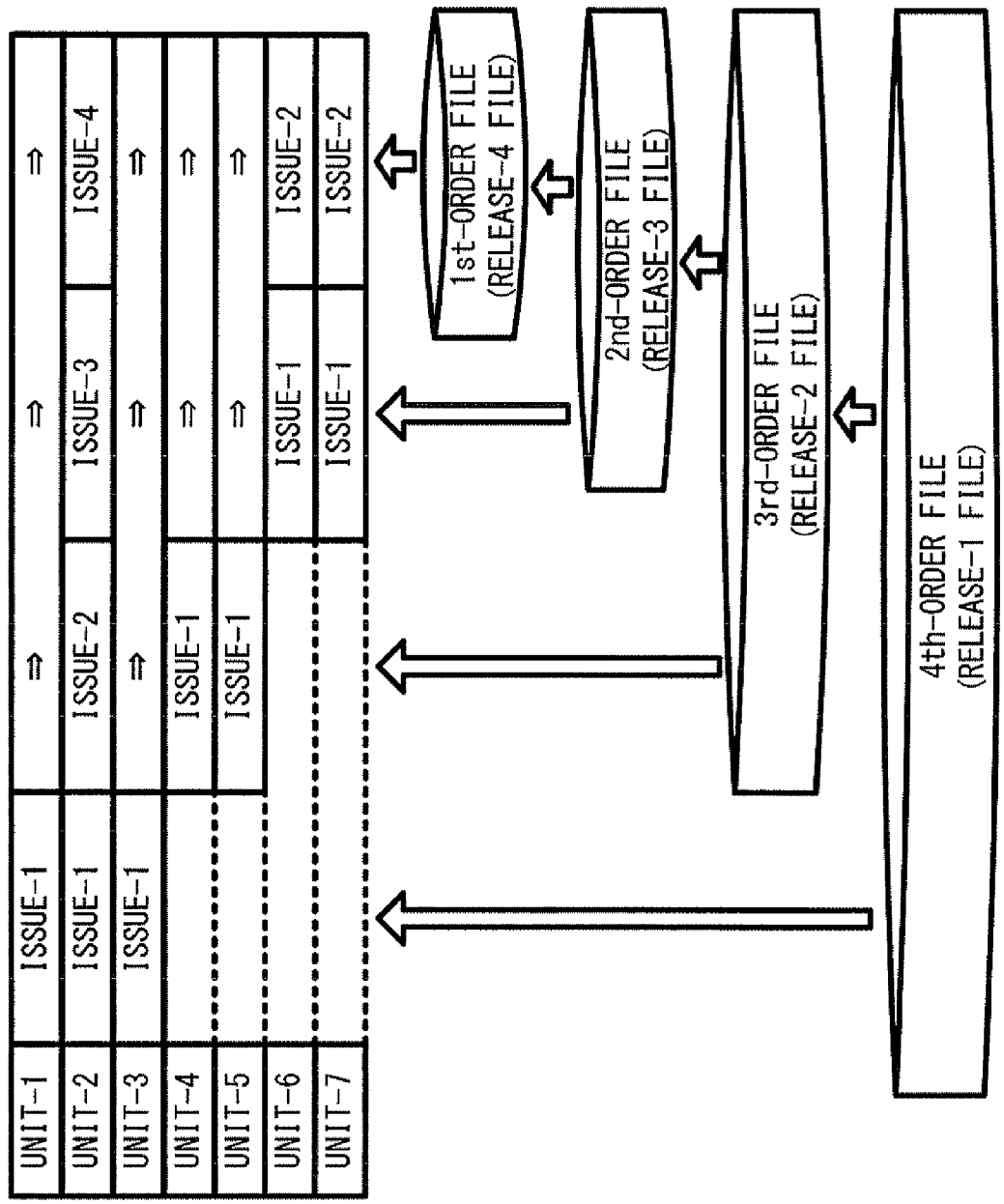
FIG. 12 is a diagram for an explanation of unpacking for upgrading.

Referring to FIGS. 11 and 12, an upgrading process is described below for a case in which the upgrading is performed to a release level (release number: RELEASE-4) specified by a maintenance person.

FIG. 11 is a flow chart illustrating the upgrading process. This process starts when the maintenance person issues an upgrade command including information indicating the release level to be achieved by the upgrading process to the transmission apparatuses 100.

FIG. 12 is a diagram for an explanation of unpacking performed for upgrading. In the example shown in FIG. 12, the firmware pack is in a state in which the second and higher order files shown in FIG. 10 have been unpacked.

In step S31, the data processing part 21 reads the firmware pack stored in the firmware storage part 3. The firmware pack read in this step is in the state, as shown in FIG. 10, in which the unpacking has been performed to obtain the firmware of the release level (release number: RELEASE-2) at which the transmission apparatuses 100 are currently operated, while the firmware pack includes the second-order file stored in the form of an packed form.

In step S32, the data processing part 21 reads the release identifier (release number: RELEASE-2) identifying the release level of the transmission apparatus 100 from the identifier storage part 4.

In step S33, the data processing part 21 sets the unpack counter disposed in the data processing part 21 to "0".

In step S34, to determine the release level to which unpacking should be performed, the difference between the new release identifier (release number: RELEASE-4) indicating the release level to be achieved by the updating and the current release identifier (release number: RELEASE-2) (the difference is "2" in this specific example) is compared with the unpack counter value. If the unpack counter value is smaller than the difference in release number, the processing flow proceeds to step S35. On the other hand, if the unpack counter value is greater than or equal to the difference in release number, it is determined that the unpacking has been performed until the firmware of the release level required for the transmission apparatuses 100 has been obtained, and thus, the processing flow proceeds to step S39.

In step S35, the firmware pack is unpacked. In this specific case, as shown in FIG. 12, the second-order file is unpacked and the firmware of UNIT-2 of ISSUE-3, UNIT-6 of ISSUE-1, and UNIT-7 of ISSUE-1 and the first-order file are obtained.

In step S36, the unpack counter is incremented. As a result, the unpack counter has a value of "1".

In step S37, the firmware of each of the UNIT-2, UNIT-6, and UNIT-7 unpacked in step S36 is stored in the firmware storage part 3. In the firmware storage part 3, the firmware of UNIT-2 is overwritten, and thus the version thereof is changed from ISSUE-2 to ISSUE-3.

In step S38, a determination is made as to whether there are more unpacked files. In this specific case, the second-order file has been unpacked in the immediately previous step, and thus there is a first-order file. Thus, the processing flow proceeds to step S34.

Thereafter, the processing loop described above is performed repeatedly until the firmware of the release level (release number: RELEASE-4) required for upgrading is extracted, as described below.

In step S34, the unpack counter has a value of "1", which is smaller than the difference ("2") in release number. Therefore, the processing flow proceeds to step S35.

In step S35, the firmware pack is unpacked. In this specific case, as shown in FIG. 12, a first-order file is unpacked, and thus firmware of UNIT-2 of ISSUE-4, firmware of UNIT-6 of ISSUE-2, and firmware of UNIT-7 of ISSUE-2 are obtained.

In step S36, the unpack counter is incremented. As a result, the unpack counter has a value of "2".

In step S37, the firmware of each of the UNIT-2, UNIT-6, and UNIT-7 unpacked in immediately previous step S36 is stored in the firmware storage part 3 In the firmware storage part 3, the firmware of UNIT-2 is overwritten, and thus the version thereof is changed from ISSUE-3 to ISSUE-4. Similarly, the firmware of UNIT-6 and the firmware of UNIT-7 are overwritten, and the version thereof is changed from ISSUE-1 to ISSUE-2.

In step S38, a determination is made as to whether there are more unpacked files. In this specific case, the first-order file has been unpacked in the immediately previous step, and thus there is no more unpacked file. Thus, the processing flow proceeds to step S39.

In step S39, because the unpacking has been performed until the firmware of the release level required for upgrading the transmission apparatus 100 has been obtained, the data processing part 21 reads the set of firmware stored in the firmware storage part 3 and transmits it to the firmware installation part 23. The firmware installation part 23 installs the unpacked firmware into the respective units 10 that need the firmware. In this specific case, the firmware of UNIT-2 of ISSUE-2 is overwritten and thus the firmware of ISSUE-4 is installed in UNIT-2. Furthermore, the firmware of ISSUE-2 is installed in UNIT-6 and UNIT-7, while the firmware is maintained at ISSUE-1 for UNIT-1 and UNIT-3 to UNIT-5.

In step S40, the data processing part 21 deletes the current release identifier (release number: RELEASE-2) from the identifier storage part 4 and stores a new release identifier (in this specific case, having a release number RELEASE-4) in the identifier storage part 4.

In the present embodiment, when it becomes necessary to upgrade the function level of the transmission apparatuses 100 being currently operated, the firmware pack including files of respective levels including the latest level is supplied to the transmission apparatuses 100 to be upgraded, and the release level to be achieved is notified to each transmission apparatus 100. The firmware pack supplied to each transmission apparatus 100 is unpacked to the release level to be achieved by the upgrading, and thus the necessary firmware is obtained.

In the embodiments described above, a plurality of transmission apparatuses located on a network and firmware applied to the transmission apparatuses have been described. Note that the embodiments may also be applied to a plurality of data processing apparatuses connected to each other via a network and software installed in the data processing apparatuses, or a plurality of data processing apparatuses connected to each other via a network and data such as a database or the like installed in the data processing apparatuses.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method of upgrading data installed in an apparatus, comprising:
    receiving a (n+1)th-order file obtained by iteratively bundling, from (n+1)=2 to x, an nth-order file including program data having an associated release level and program data having an associated release level that is earlier than the release level to which the program data included in the nth-order file is associated, into one file, until the (n+1)th-order file is obtained with (n+1) equaling x, n and x being positive integers, and x being greater than 2 and equaling a total number of release levels for which program data included in the (n+1)th order file is associated, so that the bundling is thereby performed in a release level by release level hierarchical manner;
    detecting an order m of a release level notified to the apparatus having data installed therein;
    de-bundling in a reverse of the release level by release level hierarchical manner, by a computer processor, the (n+1)th-order file as many as times corresponding to the order m of a release level to thereby obtain de-bundled data; and
    applying the de-bundled data to the apparatus.

2. A method of upgrading data installed in an apparatus, comprising:
    detecting a new release level notified to the apparatus having data installed therein;
    unpacking, by a computer processor, a data pack produced by iteratively bundling, from (n+1)=2 to x, released data and a file (an nth-order file) of data released one generation after into one file ((n+1)th-order file) such that a first-order file is produced by bundling latest released data into one file, a second-order file is produced by bundling next-latest released data and the first-order file into one file, a third-order file is produced by bundling third-latest released data and the second-order file into one file, and so on, wherein n is a positive integer, until a (n+1)th order file is produced with (n+1)=x, and x is a positive integer greater than 2 and equaling a total number of release levels for which data is bundled into the (n+1)th order file, so that the bundling is performed in a level-by-level hierarchical manner based on a release order, thereby extracting data of the new release level, and said unpacking unpacks in a reverse of the level-by-level hierarchical manner;
    installing the extracted data in the apparatus; and
    storing a release identifier indicating the new release level as a release identifier identifying the release level of the data installed in the apparatus.

3. The method according to claim 2, further comprising:
    receiving the data pack transmitted from a monitor-and-control apparatus.

4. The method according to claim 2, further comprising:
    storing the unpacked data and an unpacked nth-order file in a memory readable by a computer.

5. An apparatus having data installed therein, comprising:
    a data storage part to store a (n+1)th-order file obtained by iteratively bundling, from (n+1)=2 to x with n being a positive integer,
        an nth-order file including program data having an associated release level and program data having an associated release level that is earlier than the release level to which the program data included in the nth-order file is associated, into one file, until the (n+1)th-order file is obtained with (n+1) equaling x,
        wherein x is a positive integer greater than 2 and equaling a total number of release levels for which program data included in the (n+1)th order file is associated, so that the bundling is thereby performed in a release level by release level hierarchical manner;
    an identifier storage part to store an identifier indicating a release level of data installed in the apparatus; and
    a controller, comprising a computer processor, to
    detect the release level of data installed in the apparatus based on the identifier stored in the identifier storage part,
    de-bundle, in a reverse of the release level by release level hierarchical manner, the (n+1)th-order file stored in the data storage part as many as times corresponding to the detected release level to thereby obtain de-bundled data, and
    apply the de-bundled data to the apparatus.

6. An apparatus having data installed therein, comprising:
    a data storage part to store a data pack obtained by iteratively bundling, from (n+1)=2 to x, released data and a file (an nth-order file) into one file ((n+1)th-order file) such that a first-order file is produced by bundling latest released data into one file, a second-order file is produced by bundling next-latest released data and the first-order file into one file, a third-order file is produced by bundling third-latest released data and the second-order file into one file, and so on, wherein n is a positive integer, until a (n+1)th order file is produced with (n+1) =x, and x is a positive integer greater than 2 and equaling a total number of release levels for which data is bundled into the (n+1)th order file, so that the bundling is performed in a level-by-level hierarchical manner based on a release order;

an identifier storage part to store a release identifier indicating a release level of data installed in the apparatus; and a controller, comprising a computer processor, to
  detect the release level based on the release identifier stored in the identifier storage part,
  unpack, in a reverse of the level-by-level hierarchical manner, the data pack stored in the data storage part until data of the detected release level is obtained, and
  install the obtained data in the apparatus.

7. The apparatus according to claim 6, wherein when the data installed in the apparatus is upgraded, the controller unpacks the data pack stored in the data storage part until data of the new release level notified to the apparatus is obtained, installs the obtained data in the apparatus, and stores an identifier indicating the new release level in the identifier storage part.

8. The apparatus according to claim 7, wherein the controller stores the obtained data and an unpacked nth-order file.

9. The apparatus according to claim 6, further comprising:
a data interface part to receive the data pack transmitted from a monitor-and-control apparatus, wherein the received data pack is stored in the data storage part.

* * * * *